(12) United States Patent
Bogan (10) Patent No.: US 12,492,492 B2
(45) Date of Patent: Dec. 9, 2025

(54) SINGLE REPEAT WOVEN PANEL

(71) Applicant: Microsoft Technology Licensing, LLC, Redmond, WA (US)

(72) Inventor: Kelly Marie Bogan, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 460 days.

(21) Appl. No.: 17/327,231

(22) Filed: May 21, 2021

(65) Prior Publication Data

US 2022/0372675 A1 Nov. 24, 2022

(51) Int. Cl.
*D03D 3/08* (2006.01)
*D03D 13/00* (2006.01)
*H01H 13/705* (2006.01)

(52) U.S. Cl.
CPC ............. *D03D 3/08* (2013.01); *D03D 13/004* (2013.01); *H01H 13/705* (2013.01)

(58) Field of Classification Search
CPC ...... D03D 3/08; D03D 13/004; D03D 13/008; D03D 15/217; D03D 15/233; D03D 15/283; H01H 13/7057; H04M 1/0285; G06F 2200/1633; G06F 1/1626; G06F 1/1656; G06F 1/1616
See application file for complete search history.

(56) References Cited

U.S. PATENT DOCUMENTS

| | | | |
|---|---|---|---|
| 10,227,721 B2 | 3/2019 | Hatanaka et al. | |
| 10,755,877 B1 | 8/2020 | Wang et al. | |
| 10,770,246 B2 | 9/2020 | Lai et al. | |
| 2010/0232861 A1 | 9/2010 | Kitagawa et al. | |
| 2014/0262075 A1 | 9/2014 | Clarren et al. | |
| 2016/0269513 A1 | 9/2016 | Hiroki et al. | |
| 2017/0175304 A1* | 6/2017 | Woodruff | D03D 15/283 |
| 2018/0314301 A1 | 11/2018 | Evans et al. | |
| 2020/0270778 A1 | 8/2020 | Bogan et al. | |
| 2021/0096655 A1* | 4/2021 | Ishihara | C09J 7/22 |

FOREIGN PATENT DOCUMENTS

| | | |
|---|---|---|
| CN | 104808805 A | 7/2015 |
| CN | 209356946 U | 9/2019 |

OTHER PUBLICATIONS

"International Search Report and Written Opinion Issued in PCT Application No. PCT/US22/026619", Mailed Date: Aug. 18, 2022, 12 Pages.
Office Action Received for European Application No. 22730322.9, mailed on Jan. 5, 2024, 3 pages.
Communication under Rule 71(3) Received for European Application No. 22730322.9, mailed on Jun. 26, 2025, 06 pages.
First Office Action Received for Chinese Application No. 202280036763.4, mailed on Jun. 25, 2025, 14 Pages (English Translation Provided).

* cited by examiner

*Primary Examiner* — Jenna N Chandhok
(74) *Attorney, Agent, or Firm* — Ray Quinney & Nebeker P.C.; Paul N. Taylor (57) ABSTRACT

A woven panel for a computing device includes a woven pattern having a repeat size of greater than 25 cm by 25 cm. The woven pattern has a thread density of at least 25 threads by 25 threads per square cm. The woven panel is integrated to a computing device and is tailored to the specifics of the computing device, thereby improving the visual aesthetic and the tactile feel of the computing device.

13 Claims, 6 Drawing Sheets

SINGLE REPEAT WOVEN PANEL

CROSS-REFERENCE TO RELATED APPLICATIONS

N/A.

BACKGROUND

Computing devices, and particularly mobile computing devices, are often designed with a particular surface material. Surface materials include metal, such as aluminum, steel, titanium. In some situations, surface materials may include a textile or fabric, such as an extruded fabric, nonwoven, knit or a woven fabric.

BRIEF SUMMARY

In some embodiments, a fabric panel for an electronic device includes a woven pattern having a repeat size of greater than 25 cm by 25 cm. In some embodiments, the woven pattern has a thread density of at least 25 threads by 25 threads. In some embodiments, the woven pattern has repeat size of at least 625 threads by 625 threads. In some embodiments, the woven pattern is an irregular crepe pattern.

This summary is provided to introduce a selection of concepts that are further described below in the detailed description. This summary is not intended to identify key or essential features of the claimed subject matter, nor is it intended to be used as an aid in limiting the scope of the claimed subject matter.

Additional features and advantages of embodiments of the disclosure will be set forth in the description which follows, and in part will be obvious from the description, or may be learned by the practice of such embodiments. The features and advantages of such embodiments may be realized and obtained by means of the instruments and combinations particularly pointed out in the appended claims. These and other features will become more fully apparent from the following description and appended claims, or may be learned by the practice of such embodiments as set forth hereinafter.

BRIEF DESCRIPTION OF THE DRAWINGS

In order to describe the manner in which the above-recited and other features of the disclosure can be obtained, a more particular description will be rendered by reference to specific implementations thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example implementations, the implementations will be described and explained with additional specificity and detail through the use of the accompanying drawings in which:

FIG. 2-1 and FIG. 2-2 are representations of a panama weave, according to at least one embodiment of the present disclosure;

DETAILED DESCRIPTION

This disclosure generally relates to devices, systems, and methods for covering a surface of a computing device with a woven fabric. The choice of material, pattern, yarn size, and so forth, may affect the visual aesthetic and/or tactile feel of a computing device. The woven fabric may have a woven pattern that does not repeat across the surface to which the fabric is integrated. The properties of the woven fabric may be selected based on a performance of the fabric across the integrated surface. To achieve desired performance, one or more of the following properties may be selected: thread count, thread density, thread size, fray resistance, thread material composition, and so forth. Integrating a woven fabric having a single weave pattern to a computing device may improve the performance of the woven fabric and improve the user experience.

Figure 1:
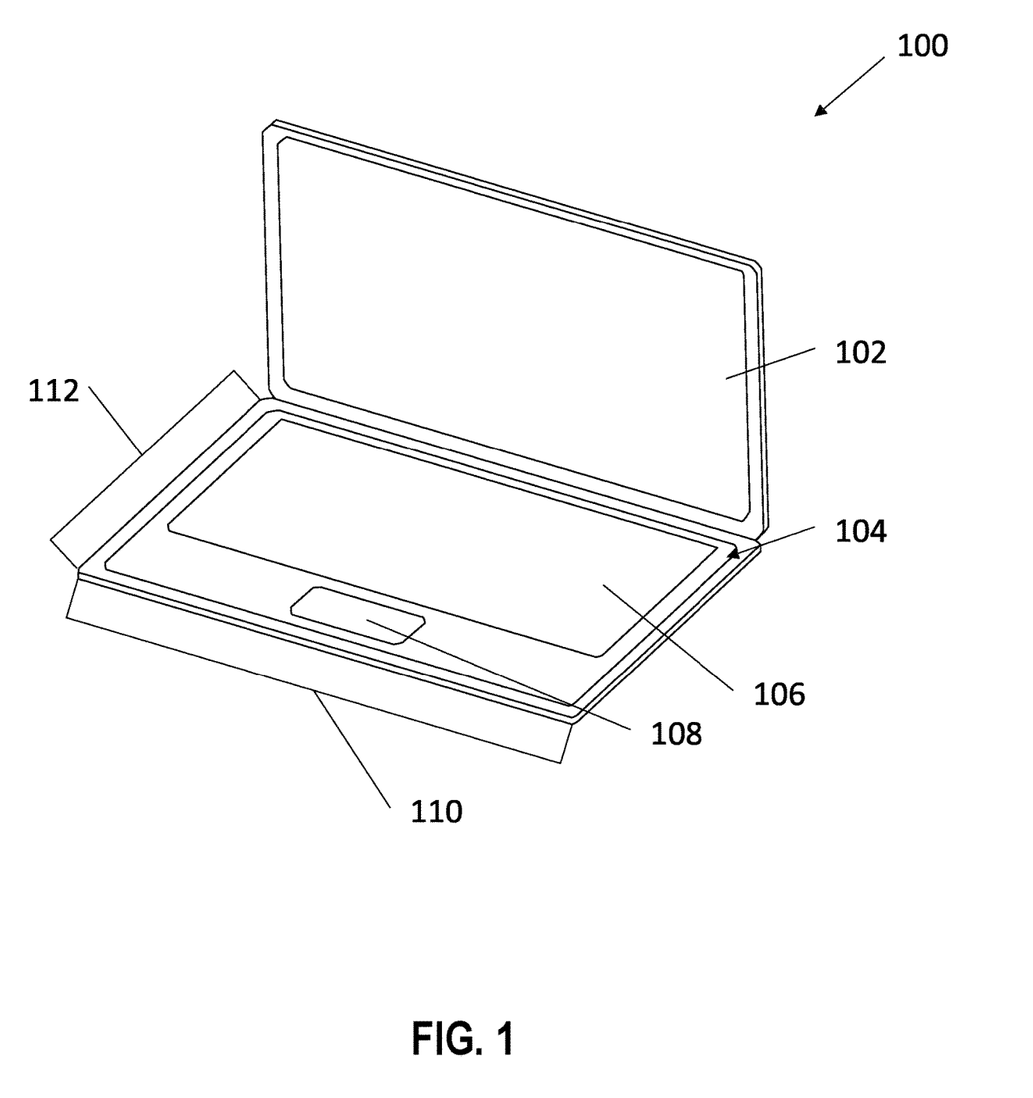
FIG. 1 is a representation of a computing device having a woven panel integrated with an input portion of the computing device, according to at least one embodiment of the present disclosure.

FIG. 1 is a representation of a computing device 100, according to at least one embodiment of the present disclosure. The computing device 100 shown includes a display 102 and an input device 104. The input device 104 may include a keyboard 106 and a track pad 108. The input device 104 may be in communication with the display 102 such that a user may interact with a graphical user display (GUI) on the display 102 using the input device, including sending commands, inputting text, controlling a curser, and so forth.

One or more surfaces of the computing device 100 may be covered with a fabric cover. A fabric cover may help to improve the look and feel of the computing device. Specifically, a fabric cover may help a developer or designer to create a specific visual aesthetic. Furthermore, a fabric cover may be used to develop a specific tactile feel of the computing device. For example, a woven fabric has a different tactile feel than metal or an extruded or other type of fabric. In accordance with embodiments of the present disclosure, a woven fabric may generate a specific tactile feel that is preferable for a user. In some embodiments, the visual aesthetic and/or the tactile feel of the fabric cover may improve the user experience. In some situations, a woven fabric may be transparent to radio waves (e.g., radio frequency (RF) transparent). This may allow the antenna design in the computing device to be flexible. For example, when designing computing devices to be compatible with a new generation of communication technology, such as 5G and other future communication technology generations, including RF transparent fabric on the computing device may allow the designer to place the antenna in a place that is convenient for antenna reception/transmission.

In some embodiments, the computing device 100 may include the woven fabric on any surface. For example, the woven fabric may be located on the portion of the computing device supporting the display 102, the outer surface of the computing device (e.g., the surface opposite the display 102), the base of the computing device 100 (e.g., the surface opposite the input device 104), the side surfaces of the computing device 100, and combinations thereof.

In accordance with embodiments of the present disclosure, the woven fabric cover may be woven with a weave that has a repeat pattern that is at least as large as the dimensions of the surface to which the woven fabric cover is attached. In some embodiments, this may improve one or more properties of the integration of the fabric cover to the electronic device. For example, a single repeat pattern across the integrated surface may help to reduce fraying at any cut ends. In some examples, a single repeat pattern may improve the look at feel of the computing device 100, including the aesthetic look and tactile feel.

In some embodiments, the woven fabric cover may be located on the surface of the input device 104. The input device 104 has a device length 110 and a device width 112. In some embodiments, the device length 110 may any value, including 2 cm, 4 cm, 8 cm, 10 cm, 12 cm, 14 cm, 16 cm, 18 cm, 20 cm, 22 cm, 24 cm, 26 cm, 28 cm, 30 cm, 32 cm, 34 cm, 36 cm, 40 cm, 42 cm, 44 cm, 46 cm, 48 cm, 50 cm, or any value therebetween. In some embodiments, the device width 112 may be any value, including 2 cm, 4 cm, 8 cm, 10 cm, 12 cm, 14 cm, 16 cm, 18 cm, 20 cm, 22 cm, 24 cm, 26 cm, 28 cm, 30 cm, 32 cm, 34 cm, 36 cm, 40 cm, 42 cm, 44 cm, 46 cm, 48 cm, 50 cm, or any value therebetween.

As discussed herein, the woven fabric may have a repeat pattern that is at least as large as the device length 110 and device width 112 of the surface of the input device. Conventionally, a woven fabric is formed from repeatedly interlacing fibers in a specific pattern. For the purposes of this disclosure, a fiber used in a woven fabric may be a yarn. While weaving, a warp may be the yarn that is oriented longitudinally in a loom and held somewhat stationary during weaving. A weft may be oriented transversely to the warp. An individual weft may be passed over and under a series of warps. When weaving a fabric, multiple wefts may be passed over and under multiple warps until a final fabric is woven.

Figure 21:
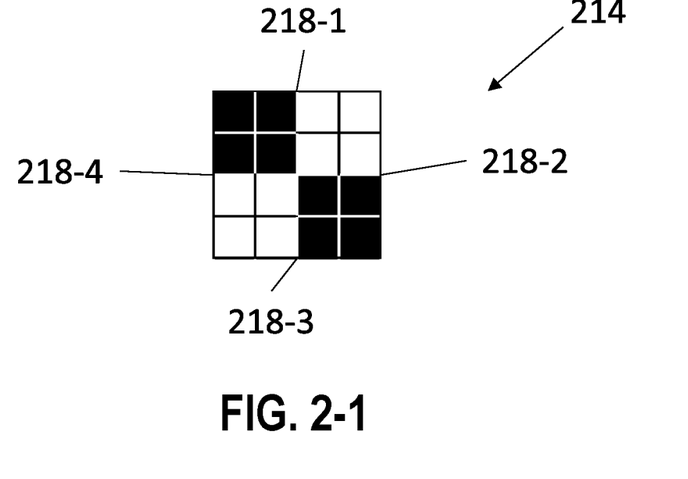
Figure 22:
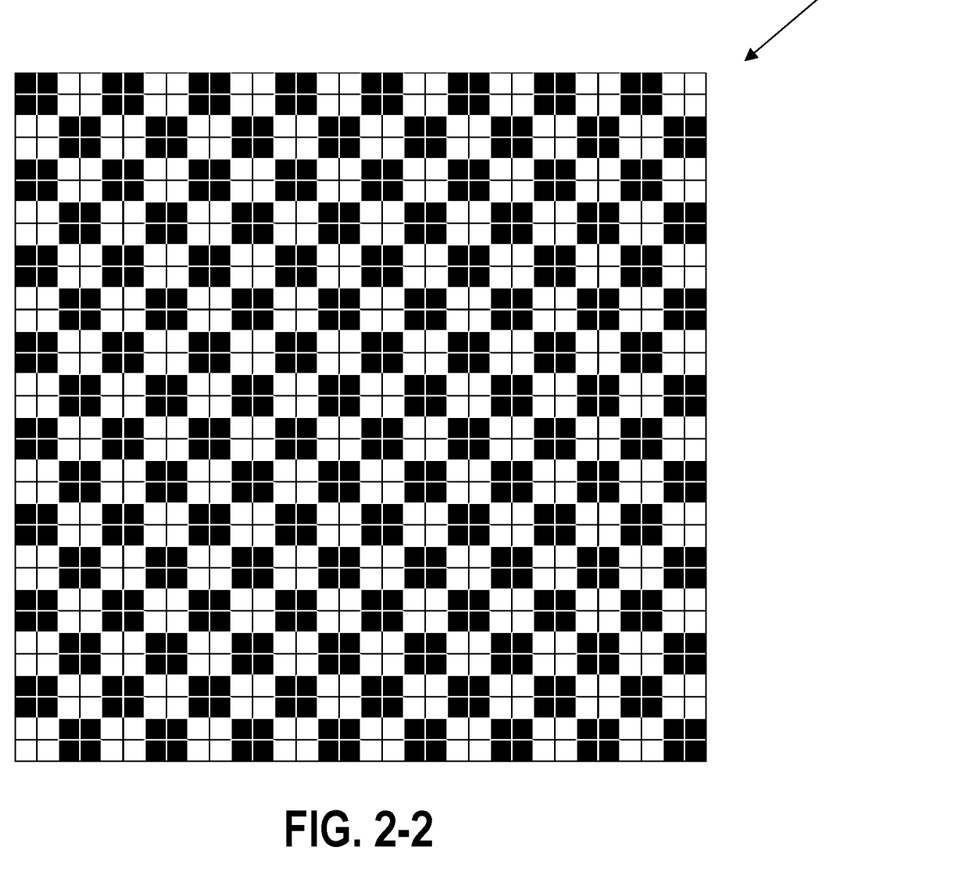

Conventionally, the wefts are interlaced with the warps in a repeatable pattern, called a repeat. A repeat may be a specific series of interlacing of the weft and warp that is repeated over a panel. For example, FIG. 2-1 shows a conventional panama weave repeat 214. As may be seen, in the panama weave repeat 214, wefts are passed over two warps and under two warps. Conventionally, repeats, such as the panama weave repeat 214, may be designed such that multiple copies of the repeat 214 may be woven adjacent to each other in a panel 216, such as the panel 216 shown in FIG. 2-2. As may be seen in FIG. 2-2, the panama weave repeat 214 is repeated multiple times throughout the panel 216. Utilizing a repeat 214 multiple times for a panel 216 may help to reduce weaving costs, including loom setup and operating costs. A repeat 214 may further generate a specific look and feel to the fabric.

In some situations, edges on a repeat 214 may align with opposing edges. For example, the repeat 214 has a first edge 218-1, a second edge 218-2, a third edge 218-3, and a fourth edge 218-4. A second copy of the repeat 214 may be located next to the first copy of the repeat 214. The fourth edge 218-4 of the second copy may be adjacent to the second edge 218-2 of the first copy. Furthermore, the first edges 218-1 of the first and second copy of the repeat 214 may be aligned. Placing the fourth edge 218-4 adjacent to the second edge 218-2 may allow the weft pattern of over two warps and under two warps to be repeated (e.g., tessellated) indefinitely. Similarly, the first edge 218-1 of the first repeat 214 may be placed adjacent to the third edge 218-3 of the second repeat 214. This may allow the pattern of the repeat 214 to be repeated indefinitely in any direction, as may be seen in the panel 216.

In some situations, the corners on repeat 214 may align with opposing corners, and the repeat 214 may be replicated diagonally. For example, the corner defined by the first edge 218-1 and the second edge 218-2 may be aligned with the corner defined by the third edge 218-3 and the fourth edge 218-4. This may cause the white squares to be replicated indefinitely diagonally across the panel 216.

While the repeat 214 shown is a panama weave repeat 214, it should be understood that there are a variety of different types of repeats. For example, conventional repeat patterns include plain, twill, crepe, satin, and their many iterations. However, each of these weaves, as well as other conventional weaves, are configured to be repeated multiple times across a panel.

The repeat 214 is formed from 4 threads×4 threads. Conventional weave repeats include sizes from 2 threads×2 threads to 40 threads by 40 threads. Furthermore, conventional weave repeats may not be square, but may include non-square dimensions, such as 10 threads by 15 threads. Nevertheless, as discussed herein, a woven fabric panel is generally constructed of multiple repeats placed next to each other.

Figure 3:
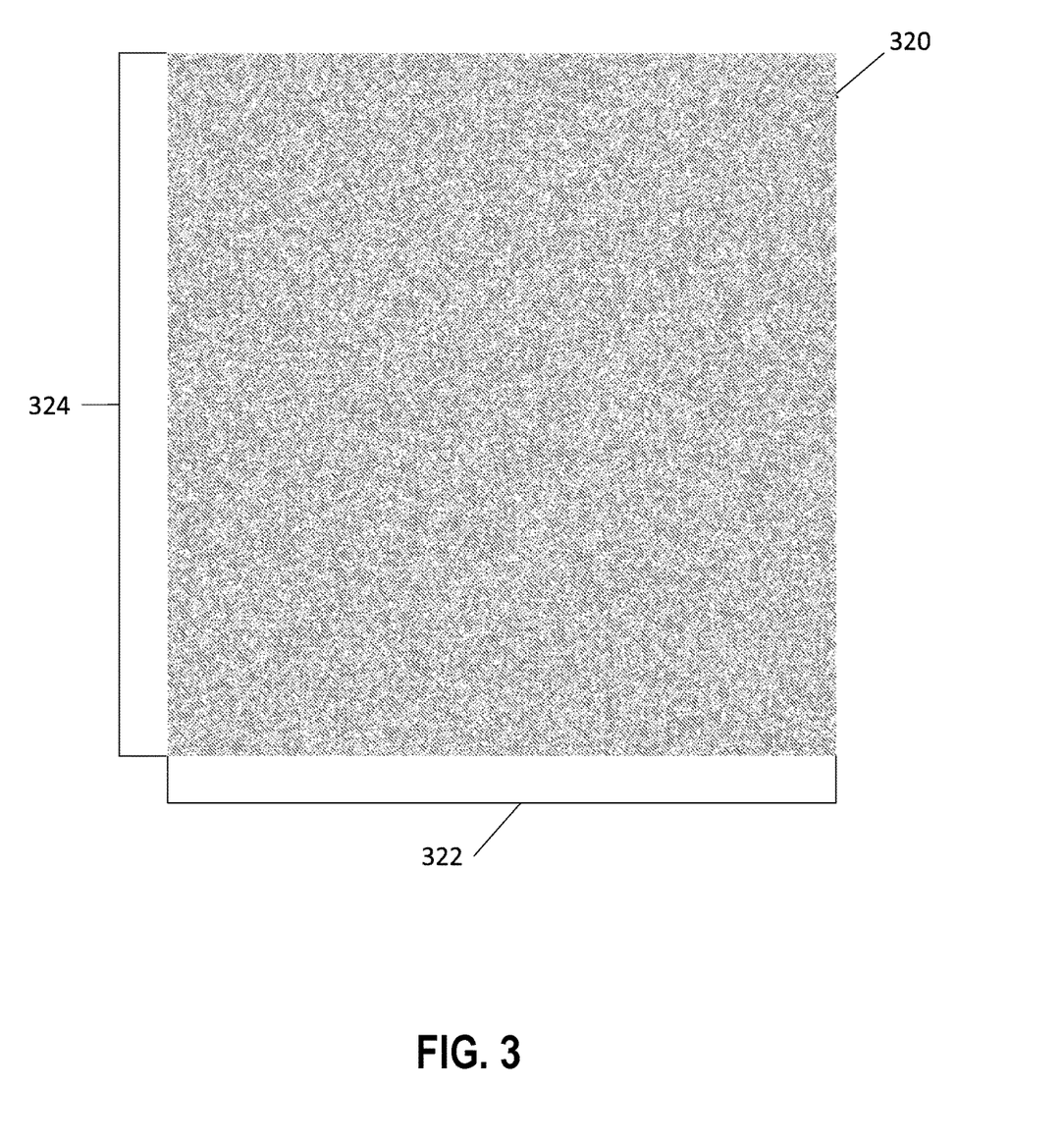
FIG. 3 is a representation of a fabric panel, according to at least one embodiment of the present disclosure.

FIG. 3 is a representation of a woven fabric panel 320 having an irregular woven pattern with a repeat size that is greater than an applied surface of a computing device, according to at least one embodiment of the present disclosure. In the embodiment shown, the woven fabric panel 320 does not include any widely repeated pattern or other repeat that is smaller than the entire panel 320. In some embodiments, including a repeat size that is greater than the applied surface of the computing device may allow for the tailored integration of multiple zones on a computing device. For example, a different weave type, density, yarn type, and so forth may be used in different areas of the computing device. In this manner, the different zones may be optimized for different uses. For example, an edge zone may be optimized for reduced fraying at the edges, a palmrest zone may be optimized for comfort of the user's palm, a keyset cutout zone may be optimized for the keyset cutouts, and so forth. Therefore, a single repeat size may provide the benefit of a woven panel that is customized for a particular computing device design.

While some portions of the fabric panel 320 may be repeated at different locations within the entire panel 320, there is no general pattern that is repeated many times from adjacent edges. For example, a 2 thread×2 thread section of a weave only has 16 possible combinations of weave patterns. Over a large panel, one or more of the 16 basic 2 thread×2 thread combinations may be repeated at least once. However, in contrast to the conventional pattern 216 shown in FIG. 2-2, the fabric panel 320 shown in FIG. 3 does not have a general repeat that is replicated by placing the pattern edges adjacent to each other, including laterally adjacent (e.g., parallel to the warp), longitudinally adjacent (e.g., parallel to the weft), and/or diagonally adjacent. In some embodiments, a 2 thread×2 thread pattern may not be adjacently replicated more than an adjacent replication number of 2, 3, 4, 5, 6, 7, 8, 9, 10, 15, 20, 25, 30 times, or any value therebetween. In some embodiments, a thread pattern of any size may not be adjacently replicated more than an adjacent replication number of 2, 3, 4, 5, 6, 7, 8, 9, 10, 15, 20, 25, 30 times, or any value therebetween. As discussed above, having an adjacent replication number of less than the values stated herein may allow a woven panel to be customized for a particular computing device design.

In some embodiments, a thread pattern of any size may not be replicated at all on the panel 320. In some embodiments, a thread pattern of any size may not be replicated more than a replication number of 1, 2, 3, 4, 5, 6, 7, 8, 9, 10, 15, 20, 25, 30 times, or any value therebetween. In some embodiments, the non-repeated thread pattern may have a size of 2 threads×2 threads, 4 threads×4 threads, 6 threads×6 threads, 8 threads×8 threads, 10 threads×10 threads, 15 threads×15 threads, 20 threads×20 threads, 25 threads×25 threads, 30 threads×30 threads, 128 threads by 128 threads, 512 threads by 512 threads, 640 threads by 640 threads, or any value therebetween. While examples herein have been provided as square patterns, it should be understood that other patterns may be used, including rectangular patterns or patterns having more than 4 sides.

In some embodiments, the fabric panel 320 may be an irregular weave pattern, such as a crepe weave pattern. An irregular weave pattern may create a broken or irregular appearance on a surface of the completed pattern. A crepe weave pattern may produce a pleasing visual aesthetic for the surface of the computing device. In some embodiments, a crepe weave pattern may generate a tactile feel that is comfortable for the user's interaction with the surface. The visual aesthetic and/or the tactile feel may help to improve the user experience.

In some embodiments, an irregular weave pattern may improve the visual aesthetic by reducing the impact of alignment skew from the manufacturing loom. In some situations, when setting up the loom to weave the fabric cover, the alignment of the weft and/or warp yarns may be skewed. For a regularly repeated pattern, such as a panama weave, the skew may be visually noticeable and unappealing to the user. An irregular weave may mask the skew, making it hard for the user to detect. In this manner, the visual aesthetic may be improved.

In some embodiments, the pattern of the crepe weave may be irregular. In some embodiments, the pattern of the crepe weave may be randomized or a randomized pattern. For example, the specific pattern of weft yarns passing above and below specific warp yarns may be randomized or partially randomized. The random assignment of the pattern may follow one or more rules, such as a weft yarn passing over or under no more than four warps. In some embodiments, the rules associated with the random assignment of the pattern may help to ensure that there are no replicated patterns on the fabric panel 320, no adjacent replicated patterns, or, as discussed herein, no more than a replication number or adjacent replication number of replicated patterns on the panel 320. For example, for an irregular weave, there may not be any more than 2 floating yarns next to each other. This may help to prevent fraying at a particular cutout, reduce the visual impact of skew, and so forth.

The fabric panel 320 has a panel width 322 and a panel length 324. In some embodiments, the panel width 322 may any value, including 2 cm, 4 cm, 8 cm, 10 cm, 12 cm, 14 cm, 16 cm, 18 cm, 20 cm, 22 cm, 24 cm, 26 cm, 28 cm, 30 cm, 32 cm, 34 cm, 36 cm, 40 cm, 42 cm, 44 cm, 46 cm, 48 cm, 50 cm, or any value therebetween. In some embodiments, the panel length 324 may be any value, including 2 cm, 4 cm, 8 cm, 10 cm, 12 cm, 14 cm, 16 cm, 18 cm, 20 cm, 22 cm, 24 cm, 26 cm, 28 cm, 30 cm, 32 cm, 34 cm, 36 cm, 40 cm, 42 cm, 44 cm, 46 cm, 48 cm, 50 cm, or any value therebetween. In some embodiments, the panel width 322 may be equal to or greater than the device width (e.g., the device width 112 of FIG. 1). In some embodiments, the panel length 324 may be equal to or greater than the device length (e.g., the device length 110 of FIG. 1). Making the panel width 322 and/or the panel length 324 equal to or greater than the device width and/or the device length of the device to which the fabric panel 320 may be applied may increase the ease of application of the fabric panel 320. For example, if the panel width 322 is greater than the device width, then the fabric panel 320 may be trimmed to fit the device width after any associated shrinkage, warpage, or other change to the dimensions of the fabric panel 320 during post-weaving processing.

In accordance with embodiments of the present disclosure, the fabric panel 320 may have a repeat size (e.g., panel width 322 by panel length 324). In some embodiments, there may be no repeated patterns and/or adjacent repeated patterns within the repeat size. In some embodiments, there may be fewer than the replication number and/or adjacent replication number of replications of a pattern on the fabric panel. In some embodiments, the repeat size of the fabric panel 320 may be 20 cm by 20 cm, 25 cm by 25 cm, 30 cm by 30 cm, 35 cm by 35 cm, 40 cm by 40 cm, 45 cm by 45 cm, 50 cm by 50 cm, or any value therebetween. As discussed herein, the repeat size of the fabric panel 320 may be larger than the computing device. This may allow for a fabric panel 320 that is customized for a particular computing device. This may improve the overall qualities of the fabric panel 320 on the computing device. For example, a customized fabric panel 320 having a repeat size that is larger than the computing device may allow for each edge zone to have a particular edge zone pattern, a cutout zone to have a particular cutout zone pattern, and a palmrest zone to have a particular palmrest pattern. This may help to reduce fraying at the edges and cutout zones and improve the visual aesthetic and tactile feel of the palmrest zone, thereby improving the user experience.

The fabric panel 320 has a thread density. The thread density of the fabric panel 320 may be the number of threads or yarns per centimeter. In some embodiments, the fabric panel may have an ends per centimeter (EPC) of 32 EPC, 34 EPC, 36 EPC, 38 EPC, 40 EPC, 42 EPC, 44 EPC, 46 EPC, 48 EPC, 50 EPC, 52 EPC, 54 EPC, 56 EPC, 58 EPC, 60 EPC, 62 EPC, 64 EPC, or any value therebetween. In some embodiments, the fabric panel may have a picks per centimeter (PPC) of 30 PPC, 32 PPC, 34 PPC, 36 PPC, 38 PPC, 40 PPC, or any value therebetween. In some embodiments, the thread density may be 32 EPC by 32 PPC, 32 EPC by 38 PPC, 32 EPC by 30 PPC, 32 EPC by 45 PPC, 32 EPC by 62 PPC, 62 EPC by 45 PPC, 62 EPC by 40 PPC. Changing the thread density may change the properties of the fabric panel. For example, a high density, such as 62 EPC by 45 PPC may reduce the chance of fraying at a cut edge. A low density, such as 32 EPC by 45 PPC may have a reduced surface texture and provide a more smooth tactile feel for a user.

In some embodiments, the fabric panel 320 is constructed from threads having a thread size. In some embodiments, the thread size may be 0.12 mm, 0.14 mm, 0.16 mm, 0.18 mm, 0.20 mm, 0.22 mm, 0.24 mm, 0.26 mm, 0.28 mm, 0.30 mm, 0.32 mm, 0.34 mm, 0.36 mm, 0.38 mm, 0.40 mm, 0.42 mm, or any value therebetween. In some embodiments, the thread size may be 78 denier, 156 denier, 167 denier, a two-ply twisted yarn, or any other thread size. In some embodiments, the thread size may be related to the thread density. For example, a smaller thread size may allow for a higher thread density without impacting the performance of the fabric panel 320, while a larger thread size may be associated with a lower thread density and a softer tactile feel for the user. In some embodiments, it may be critical that the thread size is between 78 denier and 167 denier to maintain a specific visual aesthetic and tactile feel and prevent fraying.

In some embodiments, the threads may be formed from a thread material. In some embodiments, the thread material may be a synthetic material, such as nylon or polyester. In some embodiments, the thread material may be 100 polyester, which may have a suitable melt point for use on a computing device, is dyeable, has a high strength, low pilling, and a low luster. This may improve at least one of the performance, the visual aesthetic, and the tactile feel, In some embodiments, the thread material may be a natural material, such a cotton, hemp, or wool. In some embodiments, the panel 320 may be coated with a coating to modify the performance of the panel when attached to the computing device. For example, the panel 320 may be coated with a coating to make the panel 320 waterproof, water resistant, stainproof, stain resistant, provide any other benefit, and combinations thereof.

Figure 4:
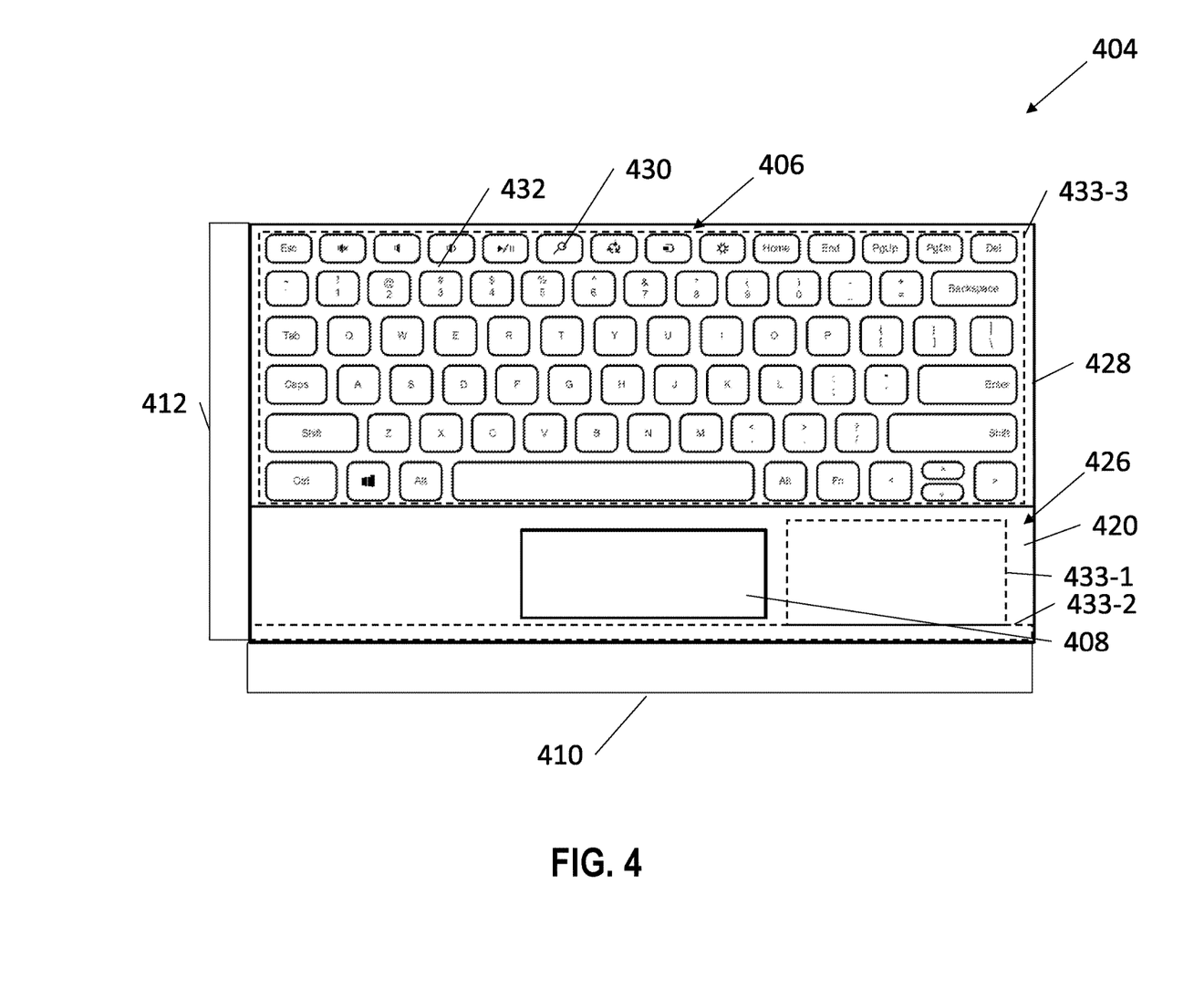
FIG. 4 is a representation of an input device having an integrated fabric panel, according to at least one embodiment of the present disclosure.

FIG. 4 is a representation of an input device 404, an input surface 426 of which is covered with a fabric panel 420, according to at least one embodiment of the present disclosure. The input device 404 includes a keyboard 406 and a track pad 408. The input device includes a housing 428 that surrounds one or more computing elements of the computing device. The housing 428 may extend around the input device 404. In some embodiments, the housing 428 may enclose one or more electronic components of the computing device, including processors, keyboard 406 input sensors, track pad 408 input sensors, speakers, any other electronic component, and combinations thereof. The housing 428 includes several outer surfaces. The surface on which the keyboard 406 and the track pad 408 are located may be the input surface 426.

The keyboard 406 includes a plurality of keyset cutouts 430. The keyset cutouts 430 may include sections of the housing 426 that have been removed to allow a keypad to be depressed and engage the one or more keyboard 406 input sensors. In the embodiment shown, the input surface 426 is covered by a fabric panel 420. The fabric cover 420 may be woven in accordance with embodiments of the present disclosure. In some embodiments, the fabric cover 420 may be woven with a pattern that does not repeat across an entirety of the input surface 426. This may help to improve the visual aesthetic and/or tactile feel of the fabric cover 420 integrated to the input surface 426.

In some embodiments, the fabric cover 420 may be cut to fit the dimensions of the input device 404, including the dimensions of the housing 428 and/or the input surface 426. For example, the input surface 426 has a device length 410 and a device width 412. The fabric panel 420 may be cut with a high precision so that the outer dimensions of the fabric panel (e.g., the panel width 322 and the panel length 324) are approximately the same as the outer dimensions of the input device 404. In some embodiments, the fabric panel 420 may be cut so that the outer dimensions of the fabric panel 420 are tactilely indistinguishable from the outer dimensions of the input device 404. For example, the outer edge of the fabric panel 420 may be within 80 micrometers of overlap the outer edge of the housing 426. Put another way, the fabric panel 420 may not overhang the outer edge of the housing 426 by more than 80 micrometers, and the outer edge of the housing 426 may not extend past the outer edge of the fabric panel 420 by more than 80 micrometers. This may help to improve the visual aesthetic and/or the tactile feel of the input device 404.

In some embodiments, the fabric cover 420 may cover an entirety of the input surface 426. For example, in some embodiments, the fabric cover 420 may extend to all of the outer edges of the housing 428 and/or the input surface 426. In some embodiments, the fabric cover 420 may extend to one, two, three, four, or more (e.g., for a non-rectangular computing device) outer edges of the housing 428 and/or the input surface 426. In some embodiments, the fabric cover may extend from edge-to-edge of the housing 428 and/or the input surface 426.

In some embodiments, the weave of the fabric cover 420 may be designed to reduce or eliminate fraying at the cut edges of the fabric cover 420. Put another way, the fabric cover 420 may be fray resistant at the cut edges of the fabric cover. For example, a crepe weave, as discussed herein, may be beneficial to reduce fraying, unraveling, or other reduction in performance of the fabric cover 420 at the cut edges. In some examples, the fabric cover 420 may be fray resistant where the fabric cover 420 is cut at a straight edge. In some embodiments, the fabric cover 420 may be cut with a rounded edge 431, such as at the corner of a keyset cutout, the corner of the housing 426, or any other location. In some embodiments, the fabric cover 420 may be fray resistant at the rounded edges of the fabric cover 420. For example, the crepe weave of the fabric cover 420 may be fray resistant at the rounded edges of the fabric cover 420. In some embodiments, not including any repeated patterns over the entirety of the fabric cover 420 may help to reduce the fraying, or may reduce the extent of the fraying, of the fabric cover 420 at the cut edges. Fraying is visually unappealing and tactilely unpleasant. Therefore, reducing fraying may improve the visual aesthetics and tactile feel of the fabric cover 420.

In some embodiments, the fabric cover 420 may be cut to form the keyset cutouts 430. In some embodiments, the fabric cover 420 may be cut with a high precision at the keyset cutouts 430 such that the edge of the fabric cover 420 is indistinguishable from the input surface 426 at the keyset cutouts. As may be seen, the interstitial portion 432 of the input portion between keyset cutouts 430 may be quite thin. For example, the interstitial portion 432 between keyset cutouts may be less than 5 mm, less than 4 mm, less than 3 mm, less than 2 mm, or any value therebetween. In some embodiments, the thread density and/or the yarn size of the fabric cover 420 may be selected to reduce the fraying at the interstitial portion 432 between two keyset cutouts 430. For example, a lower thread density may allow one or more threads to be at least partially detached from the body of the fabric cover 420. This may be visually unappealing and/or tactilely unpleasant. Furthermore, a detached thread may impact the function of a keypad by preventing it from depressing or preventing it from extending into the neutral position. Lowering the thread density may help to prevent frayed and/or detached threads on the fabric cover 420. In some embodiments, a large thread size may further lead to a thread being at least partially detached from the body of the fabric cover 420. Thus, selecting a smaller thread size may help to reduce the chance of a thread becoming detached from the body of the fabric cover 420.

In some embodiments, the fabric cover 420 may be cut to allow access to the track pad 408. Thus, as may be seen, the fabric cover 420 may be cut in multiple locations to accommodate the specific shape and other needs of the input device. Providing a fabric cover 420 having no repeat pattern over the device length 410 or the device width 412, may allow the fabric cover 420 to be generally optimized for various cutouts and edge cuts needed. In this manner, the visual aesthetic and tactile feel of the input device 404 may be optimized to improve the user experience.

In some embodiments, a particular integration surface to a computing device, such as the input surface 426, may have particular dimensions, including device length 410 and device width 412. In some embodiments, the weave pattern of fabric panel 420 may be tailored to the particular dimensions of the integration surface. Thus, a fabric panel 420 may have a variety of different dimensions, thread densities, thread size, and thread counts. For example, a 22 cm×31 cm computing device may have a thread density of 32 threads× 32 threads, and a thread size of 167 d. This may result in the fabric panel having a thread count of 704 threads×992 threads. In some examples, a 17 cm×10 cm computing device may have a thread density of 25 threads×25 threads, and a thread size of 78 d. This may result in the fabric panel having a thread count of 425 threads×170 threads. While specific examples have been provided herein, it should be understood that any combination of dimensions, thread density, thread size, and resulting thread count may be utilized in accordance with embodiments of the present disclosure.

In some embodiments, the fabric panel 420 may be secured to the input surface 426 with an adhesive. In some embodiments, the fabric panel 420 may include multiple layers of the woven fabric. For example, the fabric panel 420 may include 2, 3, 4, 5, 6, 7, 8, 9, 10, or more layers of the woven fabric.

In some embodiment shown in FIG. 4, the fabric cover 420 on the input device 404 includes a plurality (e.g., two or more) of zones (collectively 433). Each of the zones 433 of the fabric cover 420 may be associated with a location on the input device 404. For example, a palmrest zone 433-1 may be associated with a location on the input device 404 where the user's palm may rest while typing on the keyboard. An edge zone 433-2 may be the location near the edge of the input device 404 where the fabric cover 420 is cut to fit the profile of the input device 404. A keyset cutout zone 433-3 may be the area of the input device 404 that includes cutouts for the keysets, including the portion of the fabric cover 420 that is connected to the interstitial portions 432 of the keyset cutouts 430. In some embodiments, the track pad 408 may be a part of the keyset cutout zone 433-3 or may have its own cutout zone.

Each of the zones 433 may have different fabric cover 420 properties. The properties of the fabric cover 420 in each zone 433 may be tailored to the anticipated use of the input device 404 in that zone. For example, the palmrest zone 433-1 may have properties that provide it with a soft tactile feel, a smooth tactile feel, a pleasing visual, aesthetic, and so forth. This may be accomplished, for example, by providing the palmrest zone 433-1 with an irregular pattern. The irregular pattern may help to mask any skew in the material of the fabric cover 420. Furthermore, an irregular pattern may be smooth. In some embodiments, the palmrest zone may include a high loft, or with the weft yarns overlapping multiple warps in a row. A pattern with a high loft, such as a satin-type weave, may be soft to the touch and more comfortable for the user's palm to rest on.

In some examples, the edge zone 433-2 may include an irregular pattern with a high density. The irregular pattern may have a large number of interlacings. When the fabric cover 420 is cut to fit the edges of the input device 404, the high density of the fabric cover 420 at the edge zone 433-2 may help to reduce fraying of the fabric cover 420. Furthermore, a large number of interlacings may help to reduce fraying by binding the individual yarns together with a staggered or staircase effect. When an individual yarn may begin fraying, its interlacing with the neighbors may help to prevent the fray from running. In some embodiments, the edge zone 433-2 may have yarns that have a smaller size. A smaller size may further help to reduce fraying. In some embodiments, the edge zone 433-2 may include a twill pattern. A twill pattern may include a staggered or staircase pattern, which, as discussed herein, may help to reduce fraying at the cut edges.

In some examples, the keyset cutout zone 433-3 may include an irregular pattern, such as a crepe pattern. The irregular pattern may include a high thread density and/or a low thread size. A high thread density and/or a low thread size may help to increase the number of threads in the interstitial spaces 432 between individual keyset cutouts 430. Increasing the number of threads in these interstitial spaces may help to reduce fraying at the keyset cutouts. Fraying at the keyset cutout may cause the keys to catch on the frayed fibers, potentially causing the keys to stick or not properly engage. Thus, reducing fraying by increasing the number of threads may help to improve performance of the keys. In some embodiments, the trackpad 408 cutout may be a high pickpoint zone, or a location where the user may repeatedly engage the cut portion of the fabric cover 420. Including a high thread density and/or a low thread size may help to reduce the chance of fraying that may be complicated or aggravated by the user engaging the cut portion of the fabric cover 420. In some embodiments, the keyset cutout zone 433-3 may include a twill weave, which, as discussed herein, may further help to reduce fraying.

Some computing devices may further include a flexible hinge connected to the input device 404 and a display. The flexible hinge may be covered with the fabric cover 420. In some embodiments, the fabric cover 420 may include a hinge cutout zone. The hinge cutout zone may have fabric cover 420 properties that allow the fabric cover to bend and/or stretch. For example, the hinge zone may include, in the warp, every yarn or every other yarn may be a twisted yarn. A twisted yarn may increase the air in the fabric cover 420, which may increase the flexibility of the weave at the flexible hinge. In some embodiments, in the weft or the filling, the weft yarns may change in size between small (e.g., 78 denier) and large (e.g., 168 denier) yarn sizes. This may further add airspace to the weave, thereby increasing the flexibility of the hinge zone.

In some embodiments, the zones 433 may include a transition area between adjacent zones. The transition area may be several warp or weft yarns that may help to transition between weave properties of the different zones 433. This may help to improve the visual aesthetic, such as by removing sharp transitions that catch the eye.

In some embodiments, each of the zones 433 may include different fabric panel 420 properties. For example, the edge zone 433-2 may include a higher thread density than the palmrest zone 433-1 and the cutout zone 433-3, and the cutout zone 433-3 may include a lower thread size than the palmrest zone 433-1 and the edge zone 433-2. In some examples, the palmrest zone 433-1 may include a satin weave pattern, the edge zone 433-2 may include a twill weave pattern, and the cutout zone 433-3 may include an irregular weave pattern. In some embodiments, any combination of properties for the different zones 433 may be used to achieve a particular set of properties for the input device 404.

Figure 5:
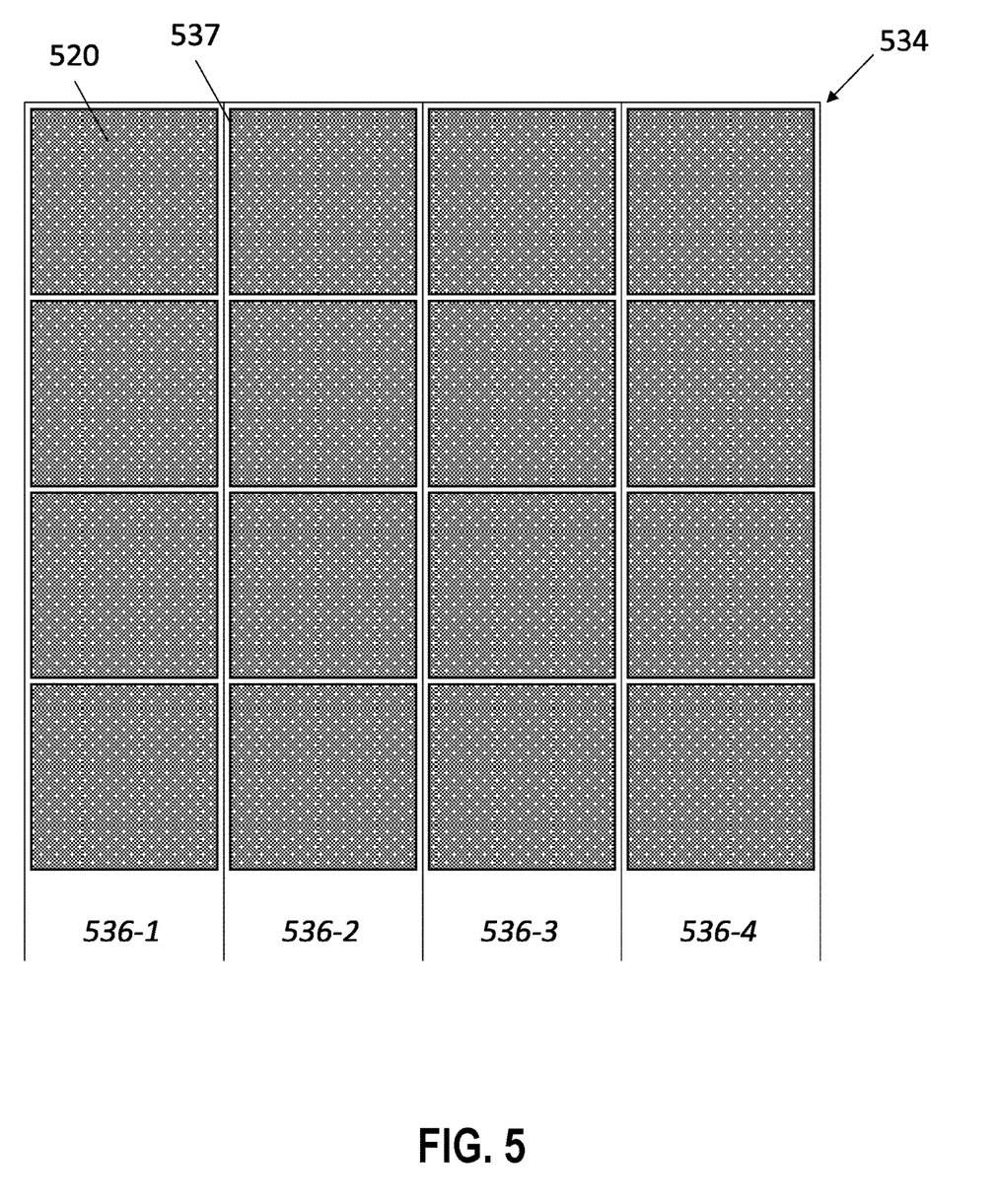
FIG. 5 is a representation of a loom panel, according to at least one embodiment of the present disclosure.

FIG. 5 is a representation of a loom panel 534, according to at least one embodiment of the present disclosure. The loom panel 534 may be the panel formed by a loom that weaves a woven fabric. In some embodiments, the loom panel 534 may include several fabric panels 520. The fabric panels 520 may be the fabric panels that are attached to a computing device. In some embodiments, to increase fabrication efficiency, a loom may weave multiple fabric panels 520 into a loom panel 534. As may be seen, the individual fabric panels 520 may be replicated one or more times on the loom panel 534. While the individual fabric panels 520 are shown as having the same pattern throughout the fabric panel 520, it should be understood that each individual fabric panel 520 may include two or more zones (e.g., the zones 433 of FIG. 4), as discussed herein.

In some embodiments, the individual fabric panels 520 may be replicated in a row, a column, or both of the loom panel 534. The loom panel 534 may include one or more loom columns (collectively 536). The loom columns 536 may be columns that are parallel to the warp of the loom panel 534. Each fabric panel 520 in an individual loom column 536 may be the same. Thus, the loom panel 534 may utilized to make several fabric panels 520 at once.

In the embodiment shown, each of the fabric panels 520 in each of the loom columns 536 are the same. Thus, each fabric panel 520 may be the same size. In some embodiments, each of the fabric panels 520 has the same weave pattern. In some embodiments, different fabric panels 520 may have different weave patterns. For example, a fabric channel in a first loom column 536-1 may have a different weave pattern than a fabric channel in a second loom column 536-2.

In some embodiments, the size of fabric panels 520 may differ across the loom panel 534. In some embodiments, the fabric panels 520 within the same loom column 536 may have the same panel width, but may have different panel lengths. Put another way, fabric panels 520 within the same loom column 536 may share at least one of panel width or panel length, but may differ in the other dimension. In some embodiments, fabric panels 520 within the same loom column 536 may have different panel lengths and different panel widths.

In some embodiments, the fabric panels 520 within different loom columns 536 may have different panel widths. In some embodiments, different loom columns 536 may have different column widths. In some embodiments, the fabric panels 520 within different loom columns 536 may have the same panel length. In some embodiments, different fabric panels 520 within different loom columns 536 may have different panel lengths and different panel widths. For example, fabric panels 520 within a third loom column 536-3 may be different in at least one dimension (e.g., panel length, panel width) than fabric panels 520 within a fourth loom column 536-4.

In some embodiments, the loom panel 534 may be oriented with a skew. To account for the skew, a panel edge 537 may be provided between individual fabric panels 520. The panel edge 537 may be sized to allow the individual fabric panels 520 to be cut square with the pattern (e.g., parallel/perpendicular to the weft and warp). In this manner, the individual fabric panels 520 may be cut out with so that the panel may be integrated with the computing device and each of the zones aligned with their associated portion of the computing device (e.g., the keyset cutout zone may be aligned with the keyboard of an input device). This may improve the fit and the integration of the fabric panels 520 with the computing device.

Figure 6:
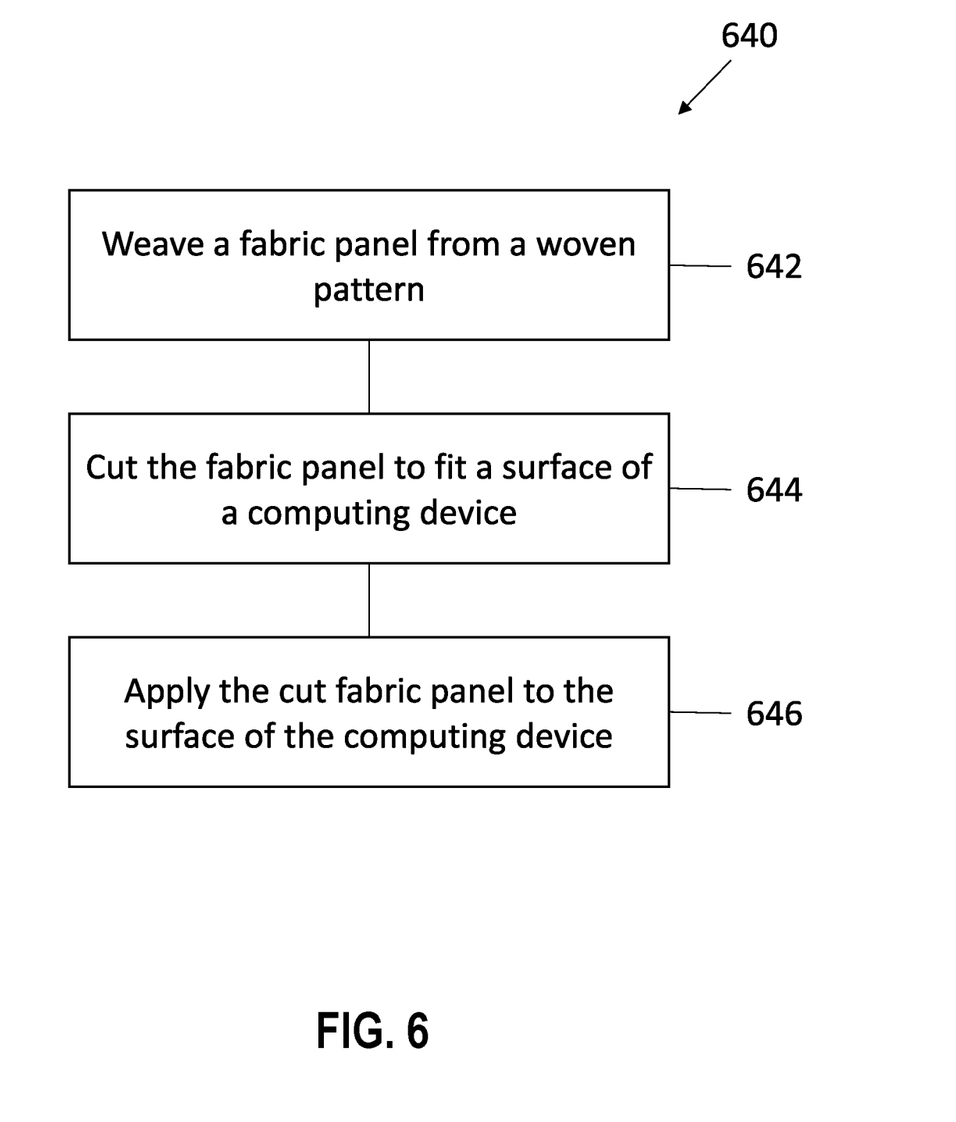
FIG. 6 is a representation of a method for applying a fabric panel to a computing device, according to at least one embodiment of the present disclosure.

FIG. 6 is a representation of a method 640 for applying a fabric panel to a computing device, according to at least one embodiment of the present disclosure. The method 640 may include weaving a fabric panel from a woven pattern at 642. The fabric panel may be woven from the a pattern having a single repeat, or having no repeat. For example, the fabric panel may be woven with no adjacent repeated sections across and entirety of its length or width. In some embodiments, the fabric panel may be fabricated specific to a particular computing device. The fabric pattern may be designed such that there is no repeated or adjacently repeated pattern across the entirety of the computing device.

In some embodiments, the method 640 may further include cutting the fabric panel to fit a surface of the computing device at 644. For example, the fabric panel may be cut to fit the outer edges of the computing device. In some embodiments, the fabric panel may be cut such that a user may not be able to feel a transition between the fabric panel and the computing device. For example, the fabric panel may be cut such that there is less than 80 micrometers of overhang of the fabric panel over the edge of the computing device, or so that the computing device does not extend more than 80 micrometers past an edge of the fabric panel.

In some embodiments, the fabric panel may be configured to be applied to an input device, such as a keyboard, of the computing device. In some embodiments, an interior portion of the fabric panel may be cut to match the dimensions of the keyboard. For example, the interior portion of the fabric panel may be cut to make room for the keyset cutouts, speakers, track pad, and so forth. In some embodiments, the keyset cutouts may be cut such that the user may not be able to visually or tactilely distinguish the edge of the fabric panel from the computing device.

In some embodiments, the method 640 may further include applying the fabric panel to the surface of the computing device at 646. For example, the fabric panel may be applied to the surface of the input portion of the computing device. This may help to improve the visual aesthetic and/or the tactile feel of the computing device. In some embodiments, the fabric panel may be applied to and/or cover an entirety of the surface of the computing device. As discussed herein, the woven pattern of the fabric pattern may not include a repeated pattern over the surface of the computing device. In this manner, the fabric panel may be tailored to the computing device to improve the visual aesthetic and/or the tactile feel of the computing device. For example, the fabric panel may be designed to reduce fraying or other deterioration of the fabric panel at any cut edges of the fabric panel.

One or more specific embodiments of the present disclosure are described herein. These described embodiments are examples of the presently disclosed techniques. Additionally, in an effort to provide a concise description of these embodiments, not all features of an actual embodiment may be described in the specification. It should be appreciated that in the development of any such actual implementation, as in any engineering or design project, numerous embodiment-specific decisions will be made to achieve the developers' specific goals, such as compliance with system-related and business-related constraints, which may vary from one embodiment to another. Moreover, it should be appreciated that such a development effort might be complex and time consuming, but would nevertheless be a routine undertaking of design, fabrication, and manufacture for those of ordinary skill having the benefit of this disclosure.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

The terms "approximately," "about," and "substantially" as used herein represent an amount close to the stated amount that still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A computing device, comprising:
   one or more electronic components;
   a housing surrounding the one or more electronic components, the housing including an input surface, the input surface including a plurality of input sensors; and
   a woven fabric panel positioned on the input surface and at least partially covering the input surface, the woven fabric panel including:
   a palmrest zone on the input surface having a tactile feel based on the woven fabric panel in the palmrest zone having a high loft weave pattern that is irregular throughout the palmrest zone;
   a cutout zone on the input surface including a plurality of keyset cutouts cut from the woven fabric panel for the plurality of input sensors, the cutout zone being fray resistant at the plurality of keyset cutouts based on the woven fabric panel in the cutout zone having a smaller thread size than both the palmrest zone and an edge zone of the woven fabric panel; and
   the edge zone on the input surface cut to an edge of the housing, the edge zone being fray resistant based on the woven fabric panel in the edge zone having a greater thread density than the cutout zone and the palmrest zone of the woven fabric panel;
   wherein the woven fabric panel has a repeat size that does not repeat across the input surface.

2. The device of claim 1, wherein the woven fabric panel covers an entirety of the input surface.

3. The device of claim 1, wherein the woven fabric panel has a woven pattern that is irregular.

4. The device of claim 1, wherein the woven fabric panel in the palmrest zone has a satin-type weave pattern that is irregular throughout the palmrest zone.

5. The device of claim 1, wherein the woven fabric panel in the edge zone has a twill weave that is irregular throughout the edge zone.

6. The device of claim 5, wherein the housing further includes a flexible hinge connecting the housing to a display of the computing device, and the woven fabric panel further includes a hinge zone at the flexible hinge that is flexible based on the woven fabric panel in the hinge zone having a weave with a greater airspace than the palmrest zone, the cutout zone, and the edge zone of the woven fabric panel.

7. The device of claim 6, wherein the hinge zone has a greater airspace based on one or more of:
   warp including one or more twisted threads in the hinge zone; or
   weft having threads of different sizes in the hinge zone.

8. A method for applying a fabric covering to a computing device, comprising:
   weaving the fabric panel of claim 1 from the woven pattern of claim 1;
   cutting the fabric panel to fit a surface of the computing device of claim 1; and
   applying the cut fabric panel to the surface of the computing device, of claim 1.

9. The method of claim 8, wherein the woven pattern is a crepe pattern.

10. The method of claim 8, wherein cutting the fabric panel includes cutting the plurality of keyset cutouts.

11. The method of claim 8, wherein applying the fabric panel to the surface includes applying the fabric to an entirety of the surface of the computing device.

12. The device of claim 3, wherein a repeated thread pattern within the woven pattern does not repeat at laterally adjacent, longitudinally adjacent, and diagonally adjacent edges of replicated instances of the repeated thread pattern in the woven pattern.

13. The device of claim 3, wherein, in the woven pattern, no more than 2 floating yarns are next to each other.

* * * * *